United States Patent [19]
Roberts

[11] Patent Number: 5,969,840
[45] Date of Patent: Oct. 19, 1999

[54] OPTICAL ELEMENT POWER CONTROL

[75] Inventor: Kim Byron Roberts, Herts, United Kingdom

[73] Assignee: Northern Telecom Limited, Montreal, Canada

[21] Appl. No.: 08/715,662

[22] Filed: Sep. 18, 1996

[30] Foreign Application Priority Data

Sep. 6, 1996 [GB] United Kingdom .................. 9618706

[51] Int. Cl.⁶ ............................................... H01S 3/16
[52] U.S. Cl. .......................... 359/161; 359/124; 359/171; 359/176; 359/179
[58] Field of Search .................................. 359/124, 125, 359/161, 171, 176, 179

[56] References Cited

U.S. PATENT DOCUMENTS

| | | | |
|---|---|---|---|
| 3,965,433 | 6/1976 | Yeh ........................................... | 328/155 |
| 5,088,095 | 2/1992 | Zirngibi ...................................... | 372/6 |
| 5,225,922 | 7/1993 | Chraplyvy et al. ...................... | 359/124 |
| 5,276,543 | 1/1994 | Olshansky ................................ | 359/124 |
| 5,353,146 | 10/1994 | Webb ........................................ | 359/158 |
| 5,396,360 | 3/1995 | Majima ..................................... | 359/133 |
| 5,513,029 | 4/1996 | Roberts ..................................... | 359/177 |
| 5,764,404 | 6/1998 | Yamane et al. .......................... | 359/341 |

*Primary Examiner*—Edward Lefkowitz
*Attorney, Agent, or Firm*—Lee, Mann, Smith, McWilliams, Sweeney & Ohlson

[57] ABSTRACT

A control system for an optical element such as an optical amplifier in an optical transmission system determines the transmitted optical signal power in each of a plurality of different optical wavelength bands, determines which of the powers is closest to a threshold, and controls an output power of the element, or controls a parameter which affects the threshold, on the basis of the power closest to the threshold. Since there is no longer any need to allow a margin for possible gain variations between different wavelengths, power output can be controlled with reduced upper or lower margins, and thus error rates reduced, or transmission distances increased.

17 Claims, 10 Drawing Sheets

OPTICAL ELEMENT POWER CONTROL

FIELD OF THE INVENTION

The present invention relates to control systems for optical elements, to optical amplifiers incorporating control systems, to methods of controlling an optical element, and to methods of operating an optical transmission system.

BACKGROUND OF THE INVENTION

The distance between optical terminals of optical fibre transmission systems is limited by various factors, including the optical power of the optical signal being transmitted. If the power is too low, the signal will be difficult to distinguish from noise. If the power is too great, distortion of the signal will occur. One type of distortion which can occur in optical fibre is self-phase modulation. The onset of this type of non-linear degradation can be quite sharp, in that only one or two dB of increase in power level can push a signal from optimal performance to a failed state.

Thus, for a given target acceptable bit error rate (BER), or acceptable risk of any errors, there will be an upper limit to the optical power of the optical signal when it is launched into an optical fibre by a transmitter. Correspondingly, there will be a lower power limit or threshold for the optical signal at the receiver, following inevitable attenuation in the optical fibre. Output power levels generally need to be held as high as possible so that the power level after attenuation by the optical link does not fall below the noise threshold, and become excessively degraded by optical noise.

Careful control of the output power of transmitters and of repeaters, or optical amplifiers is therefore necessary. Other optical elements such as filters, attenuators, dispersion compensators, and so on may also need to be controlled bearing in mind the optical signal power requirements. The power gains and losses in the optical path, and in the various optical elements in the path, will vary with wavelength, age, and temperature. In some cases, the power will be affected by multiplexed signals being added or removed. For example, in optical amplifiers, the gain at each wavelength depends upon the pump power into the amplifier and on the number and power levels of the signals present.

Conventionally, to ensure that all signals in the transmission system do not suffer excessive degradation, the worst case sums of all these variations must be identified for a particular system, and a margin of error, a power margin, must be allowed for the worst case variations. This margin reduces the available performance of the system, for example reducing the maximum allowed transmission distances between repeaters or optical amplifiers.

It is known to control optical amplifiers to maintain a constant pump current, or a constant pump power, or a constant gain. However, the preferred type of control is constant total output power control. The control of gain in an optical amplifier such as an erbium-doped amplifier is discussed in U.S. Pat. No. 5,088,095. Undesirable gain fluctuations resulting from saturation effects in the amplifier are compensated in a number of ways. A feed forward automatic gain control loop acts on the pump source to increase the gain when a transient of higher signal power is detected at the amplifier input. A second method is to compensate for any variation of signal input by actively counter modulating the optical power of one of the input channels. Finally, it is suggested to feed back a selected wavelength from the output to the input. Ring lasing occurs at the feedback wavelength and consequently the gain in the amplifier is held at a constant value.

It is known from U.S. Pat. No. 5,513,029 (Roberts) to measure the relative output powers of different wavelengths in a wavelength division multiplexed (WDM) system, and control the individual wavelength powers. This document is not considered to be prior art under USC 102 as it originates from the same inventor and was published on Apr. 30, 1996.

In many situations, it will not be practical to control separately the output powers of different wavelength bands in a WDM system. Where it is only practical to control the overall output power of an optical element, or the power of two or more bands, there remains the necessity to allow for considerable power margins. For example, when more than one optical wavelength is amplified by an optical amplifier, a desired total power level may be set at 20 milliwatts. For four wavelengths, this gives a mean power of 5 milliwatts per wavelength. However, owing to gain variations including gain tilt, one wavelength may be at 17 milliwatts and another three may be at 1 milliwatt each. The 17 milliwatt signal will be severely degraded by non-linearities. This example is over simplified for the purpose of clarity.

SUMMARY OF THE INVENTION

The invention is concerned with providing power control which addresses the abovementioned problems.

According to the invention, there is provided a control system for an optical element for an optical transmission system, comprising:

means for determining transmitted optical signal powers in each of a plurality of different optical wavelength bands;

means for determining which of the powers is closest to a threshold; and means for controlling an output power of the element, on the basis of the power closest to the threshold.

By determining optical powers in each of a plurality of different optical wavelength bands, power output can be controlled with reduced upper or lower margins, since there is no longer any need to allow for possible gain variations between different wavelengths.

According to a preferred feature the power closest to the threshold is determined by ascertaining which of the powers is greatest. This enables the upper margin to be reduced to a first approximation, taking into account gain variations for different bandwidths, in a manner which is relatively straightforward to implement.

Advantageously the system comprises means for determining the threshold as the maximum power for a given risk of transmission errors. Whether determined dynamically or using a predetermined value, the upper margin can be reduced to a better approximation and an error signal for the power output control can be generated with a minimum of calculation.

Advantageously the system comprises means for determining the threshold as the minimum power for a given risk transmission errors. Again, this can be determined dynamically by feedback of BER values, or generated using a predetermined value. The lower margin can be reduced to a better approximation, and an error signal generated with a minimum of calculation.

Advantageously the threshold comprises a different level determined for each wavelength band. This enables the upper or lower margin to be reduced to a greater degree.

Advantageously an anticipated power is estimated and used to determine which band is closest to the threshold. Such control can take into account any effects such as gain tilt resulting from changed power levels, which might cause a different band to have the greatest power, or be closest to its threshold.

Preferably, the power determining means comprises means for measuring the amplitude of low frequency dither signals in each of the bands of the transmitted optical signal, means for measuring the total power, and means for deriving the power in each band from the amplitudes and the total power. This represents a particularly economical way of determining the power in each band, making use of dither signals which may be provided already, for other purposes. Measuring the dither amplitudes and deriving the power in each band need not use expensive optical processing hardware, but can be implemented relatively easily in low frequency electronic circuitry.

Advantageously the power determining means is located remotely from the element. It may be appropriate to measure the power at a receiving end after attenuation in the optical link, yet use the results to control an element at or near the transmitting end of the link.

Advantageously the per-band power is dfetermined after wavelength demultiplexing at a receiver. This enables powers to be derived directly from signal amplitudes.

Advantageously the control system is incorporated in an optical amplifier. Such devices intrinsically may amplify different wavelength bands differently, and thus conventionally generous margins need to be allowed.

According to another aspect of the invention, there is provided a control system for an optical transmission system, the control system comprising:

means for determining optical power at a plurality of different optical wavelength bands in the transmission system;

means for determining which of the powers is closest to a threshold, at which transmission errors may be caused; and means for controlling on the basis of the power closest to the threshold a parameter which affects the threshold.

Altering the threshold can achieve the same result as controlling the power output. This can be particularly advantageous if there is little scope for altering the power output, for example where upper and lower thresholds are relatively close. External attenuation or gain for some wavelengths, downstream of a transmitting element, or dispersion compensation or bit rate, would be examples of parameters affecting the threshold. Altering the threshold can of course be combined with controlling output power of an element in the transmission system.

According to another aspect of the invention, there is provided a control system for an optical wavelength division multiplexed transmission system, the control system comprising:

means for determining optical powers in each of a plurality of different optical wavelength bands in the transmission system;

means for selecting a subset of the determined powers; and means responsive to the selected subset of powers, to control a parameter of the transmission system to maintain at least the subset of determined powers within a given range.

By controlling the element on the basis of a subset of the powers, priority can be given to that subset, whether it be because they are closest to thresholds or because they carry more valuable data, or any other reason.

According to another aspect of the invention, there is provided a method of controlling an optical element comprising the steps of:

determining optical powers in each of a plurality of different optical wavelength bands;

determining which of the powers is closest to a threshold; and controlling an output power of the element on the basis of the output power closest to the threshold.

According to another aspect of the invention, there is provided a method of operating an optical transmission system comprising the steps of:

determining optical powers in each of a plurality of different optical wavelength bands;

determining which of the powers is closest to a threshold at which transmission errors may be caused; and controlling on the basis of the power closest to the threshold, a parameter of the system which affects the threshold.

According to another aspect of the invention, there is provided a method of controlling an optical element comprising the steps of:

determining optical powers in each of a plurality of different optical wavelength bands;

selecting a subset of the determined powers; and controlling a parameter of the optical element on the basis of the selected subset of powers.

According to another aspect of the invention, there is provided a method of operating an optical transmission system comprising an optical amplifier, the method comprising the steps of:

determining optical output powers in each of a plurality of wavelength bands;

selecting a subset of the determined powers; and controlling the total output power of the amplifier on the basis of the subset.

In principle, any of the preferred features set out above can be combined as appropriate by a skilled man.

BRIEF DESCRIPTION OF THE DRAWINGS

For a better understanding of the invention and to show how the same may be carried into effect, by way of example, embodiments will now be described with reference to the drawings in which.

DETAILED DESCRIPTION

Figure 1:
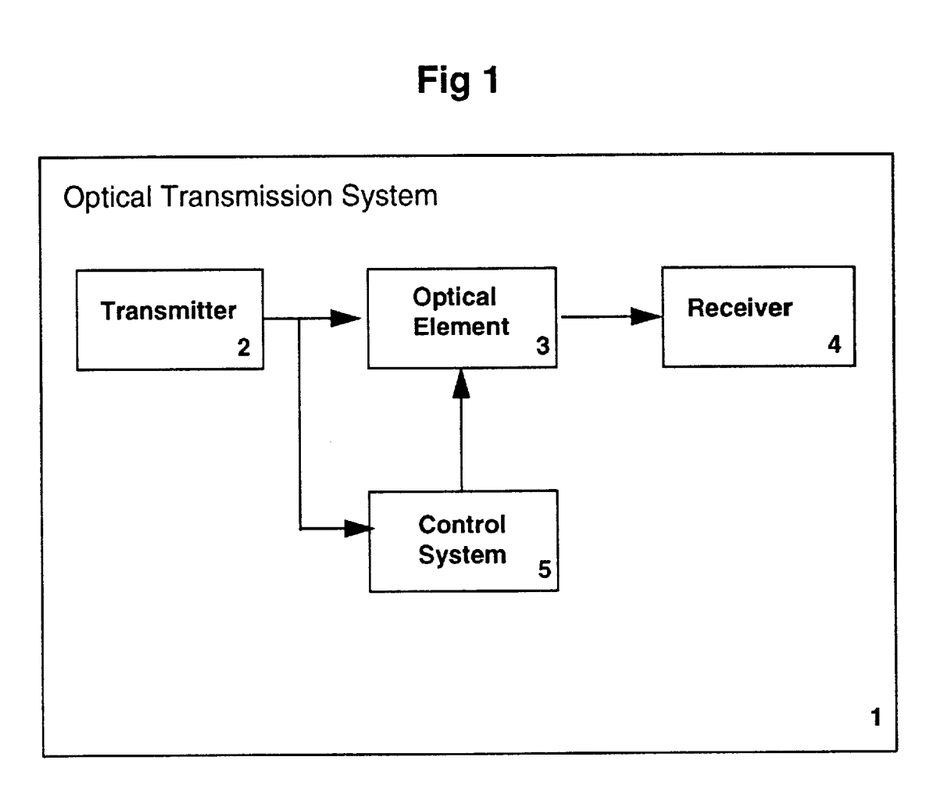
FIG. 1 shows an optical transmission system including a control system of the present invention.

FIG. 1 shows an optical transmission system comprising a transmitter 2, an optical element 3, and a receiver 4. A control system 5 is provided for controlling the optical element 3. The optical element 3 can be any optical element which affects the power of the optical signal in a controllable way. Thus it can be an optical amplifier, an optical filter, or an attenuator for example. Multiple such elements could be arranged in series or in parallel, and be controlled by the same control system. Furthermore, although not illustrated, the control system of the invention could be used to control the output power of the transmitter. If the transmitter is a semi-conductor laser, the control system could control the bias current of the laser.

Figure 2:
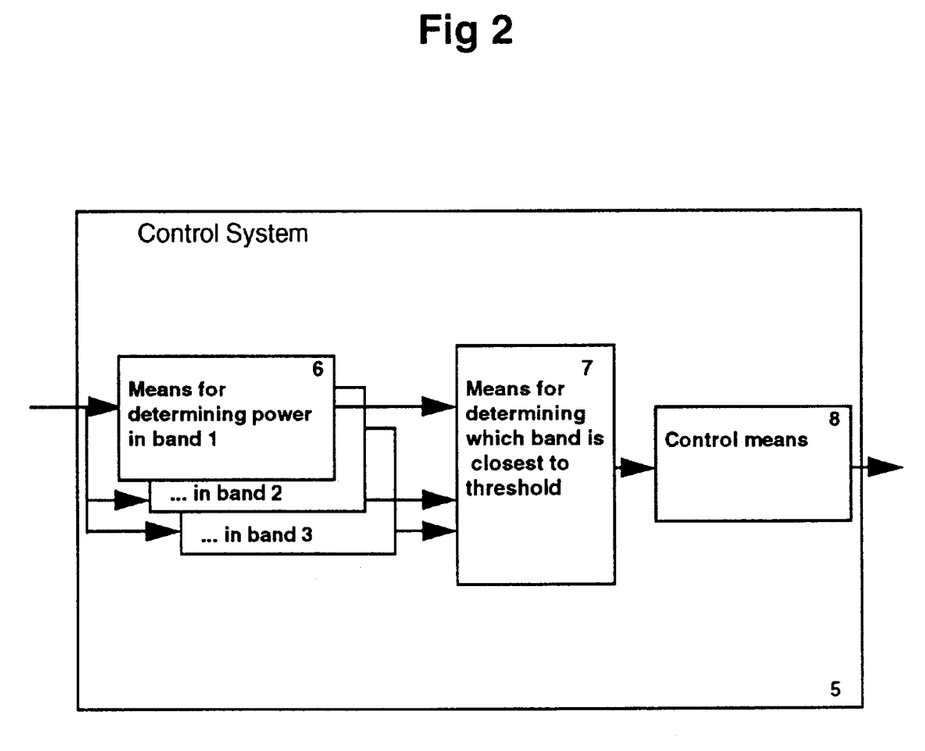
FIG. 2 shows in schematic form a control system for use with the transmission system of FIG. 1.

The control system will be described in more detail with reference to FIG. 2. FIG. 2 shows three elements of the control system. Firstly there is a means 6 for determining the optical signal power in a particular wavelength band. A means 7 is provided for determining which band is closest to a given threshold. A control means 8 is provided for generating a control signal for the optical element on the basis of the optical signal power of one or more of the wavelength bands.

All three parts of the control system can be implemented in software to be run on conventional micro-controller hardware. Digital inputs to the micro-controller can be generated by an analogue to digital converter, fed by an optical to electrical converter such as a PIN diode. Such elements will have a low pass filtering effect.

Further details of an example of how to implement the means for determining the power in each band, and how to implement the control means 8 will be set out later. Various ways of implementing the means 7 for determining which band is closest to the threshold will now be described with reference to FIGS. 3 to 6. These figures show in schematic form functional features which can be implemented in practice by a conventional micro-processor.

Figure 3:
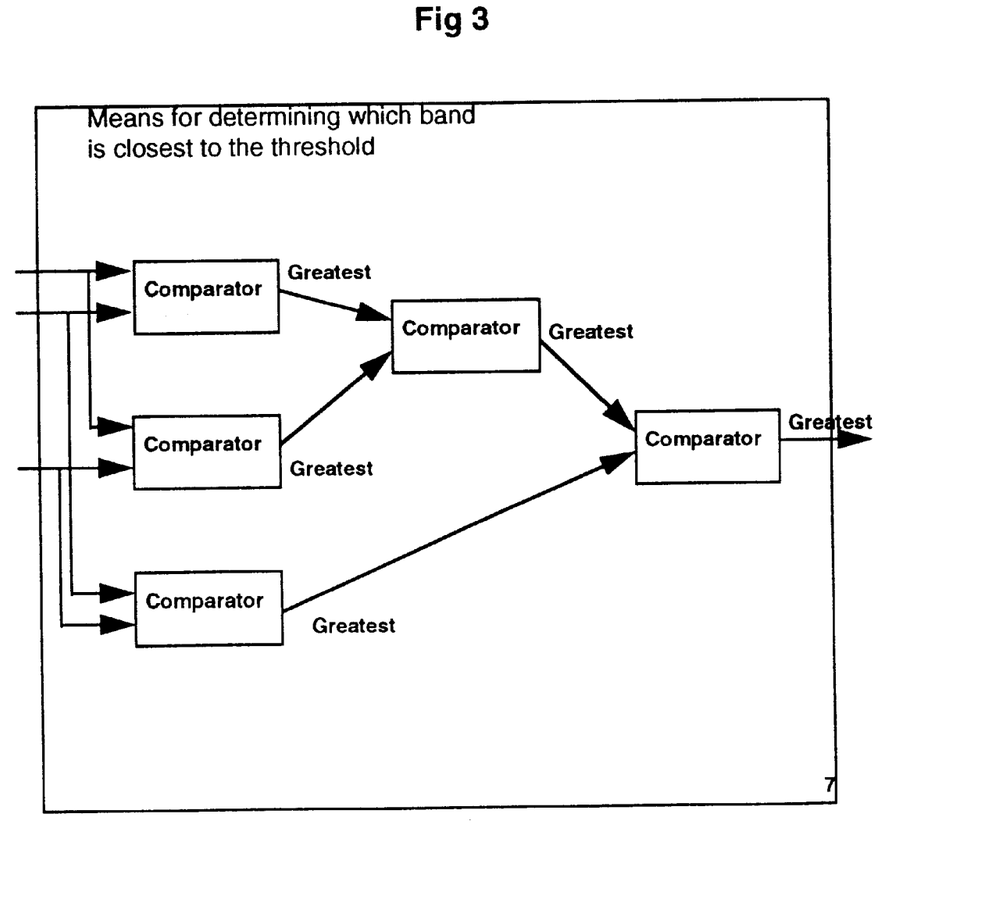
FIG. 3 shows in schematic form means for determining which band is closest to the threshold, for use in the control system of FIG. 2.

FIG. 3 shows inputting signals or values representing the power in the optical signal in each band (three bands are shown, though any number can be used). Pairs of these signals are compared to find the greatest. Two further stages of comparitors can be used to find the greatest of all three inputs. At least where the threshold is higher than all the inputs, this method is sufficient to determine which band has an optical signal power closest to the threshold. This method may be sufficient for cases where the threshold differs little for the different bands. At the same time, or alternatively, the control system may be concerned with a lower threshold for signal power, at which optical noise will cause unacceptable transmission errors. In this case, a corresponding method can be used in which each comparator identifies the least power band, rather than the greatest power band. The control means 8 could then act on the basis of the band having least power (not illustrated).

Figure 4:
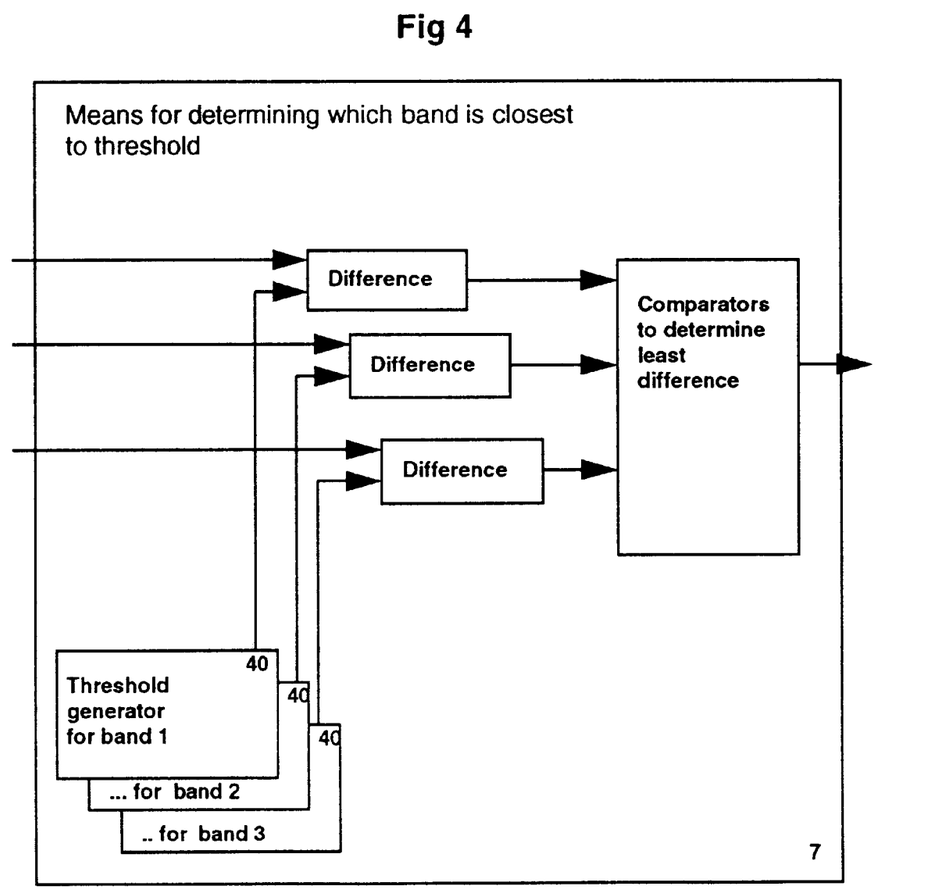
FIG. 4 shows an alternative means for determining which band is closest to the threshold.

FIG. 4 shows a slightly more complicated method which is suitable for systems where the threshold may be different for different bands. Here, a threshold generator 40 is provided for each band. A difference is obtained between the threshold and the measured power for each band. Comparators can then determine which band is closest to its respective threshold. If appropriate, the comparators can take into account the sign of the differences, to determine the least positive difference, so that if one band power measurement has exceeded a threshold, it is regarded as having the least difference. All of the functions shown in schematic form in FIG. 4 can be implemented in conventional micro-controller circuitry. As before, the threshold may be an upper threshold or a lower threshold or control could be based on a combination of both techniques.

Figure 5:
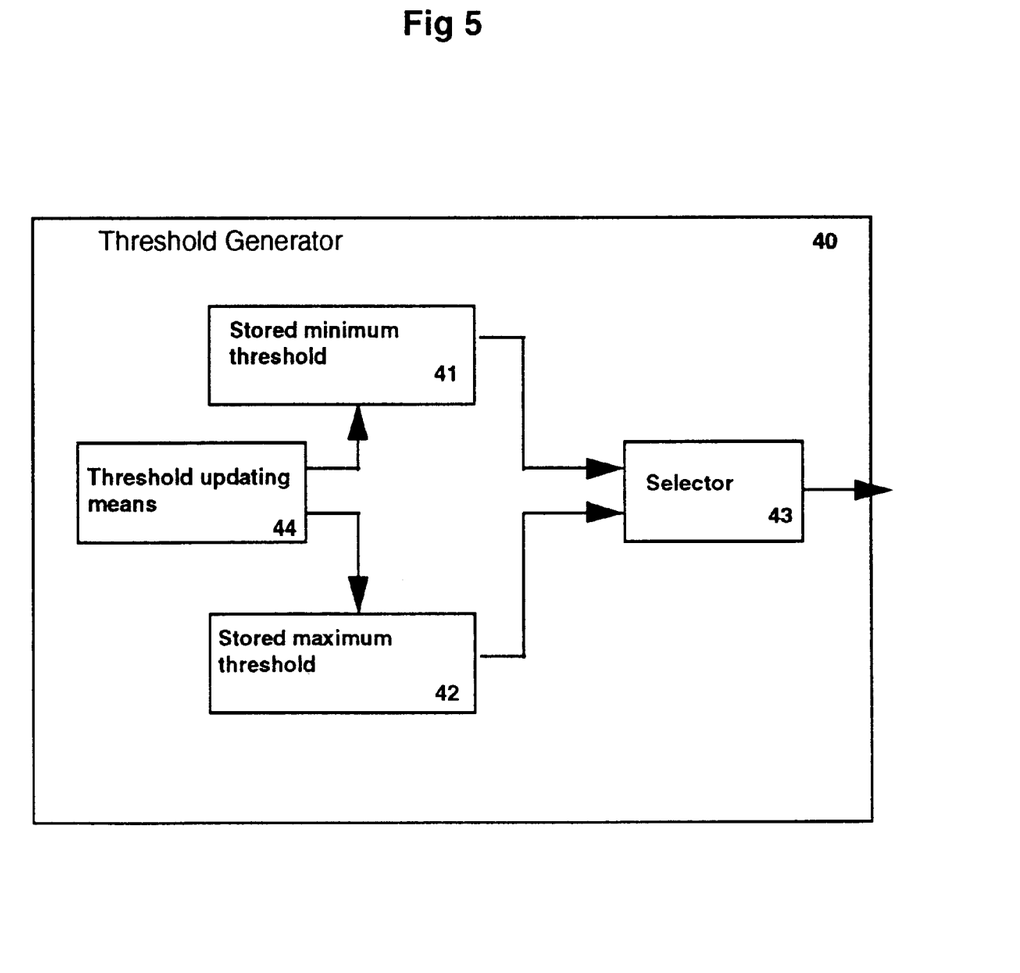
FIG. 5 shows a threshold generator for use in the means shown in FIG. 4.

FIG. 5 shows in more detail in schematic form a threshold generator for use with the means of FIG. 4. Lower and upper thresholds, may be stored as shown in elements 41 and 42, for selection by a selector 43. A threshold updating means 44 is shown to enable the thresholds to be altered, or dynamically controlled as parameters of the system change with age or operation. Again, the threshold generator can be implemented for any number of bands, using conventional microcontroller circuitry.

Figure 6:
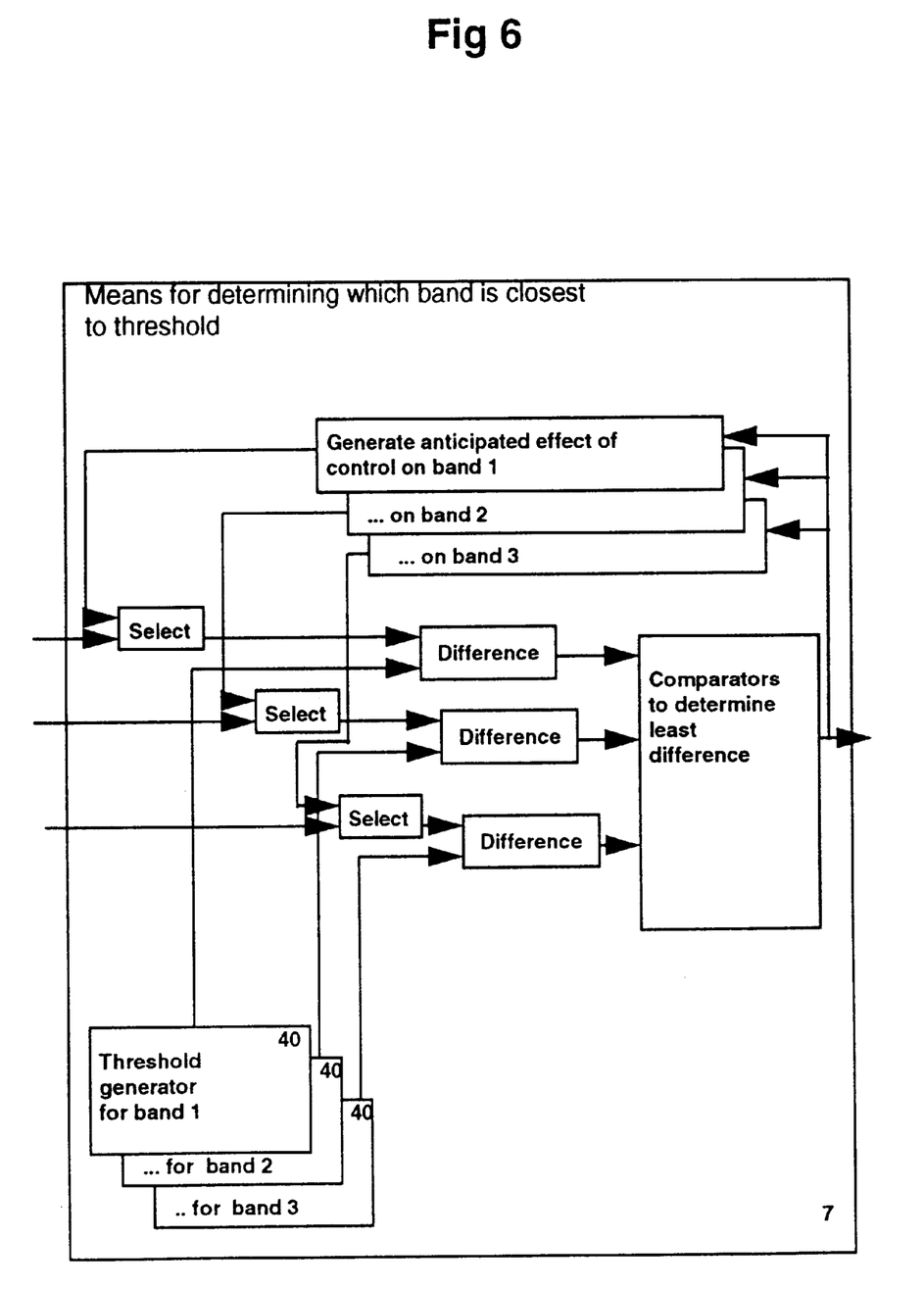
FIG. 6 shows a further alternative means for determining which band is closest to the threshold, for use in the system of FIG. 2.

FIG. 6 shows a further alternative means for determining which band is closest to the threshold. In this case, there is an addition to the means shown in FIG. 5, to enable the effect of the control means 8 to be anticipated in determining which band is closest to its threshold. For devices such as optical amplifiers where there may be considerable gain tilt, it may be possible to obtain better control by anticipating the effect of the control on each band. Then the determination of which band is closest to its respective threshold can be carried out wholly or partly on the basis of the anticipated rather than the measured power in each band.

Such a method may improve the stability of the control, and reduce oscillations.

Figure 7:
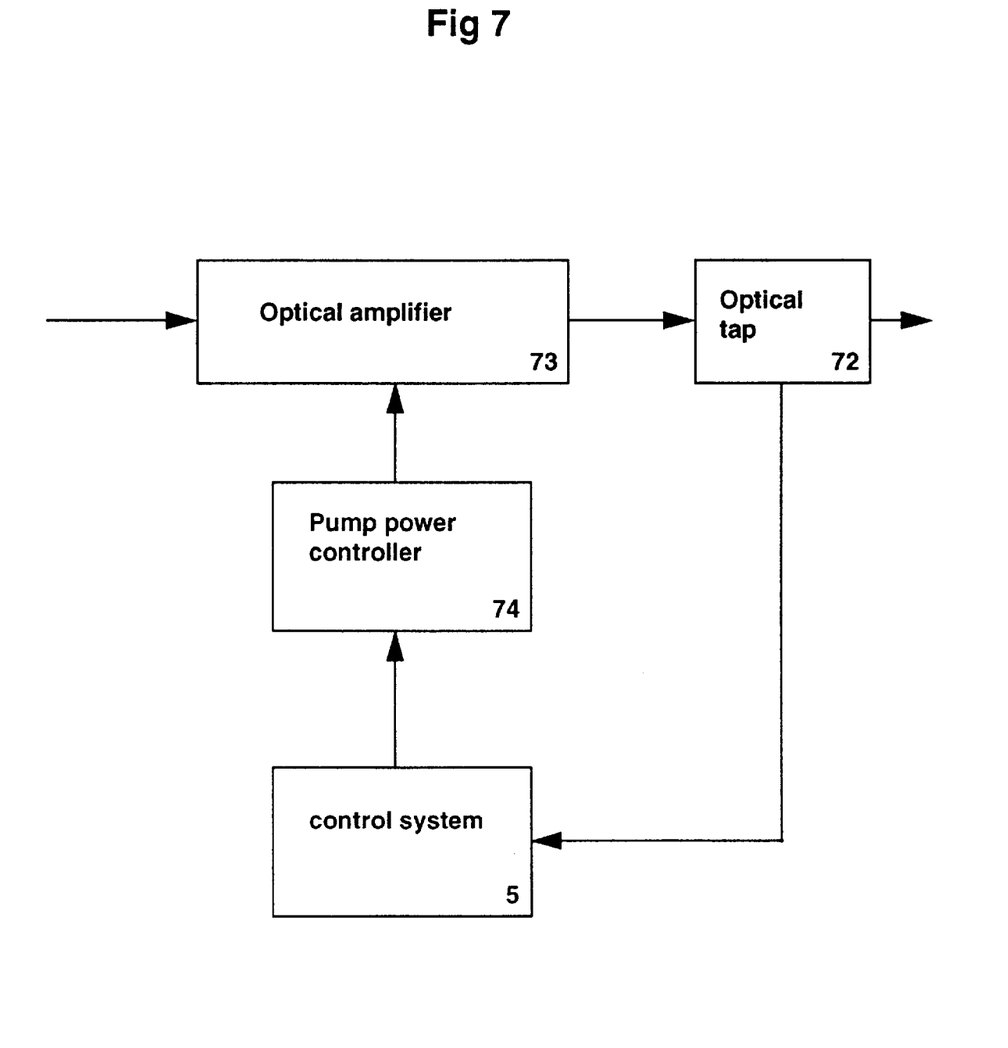
FIG. 7 shows an optical amplifier with a control system of the invention.

FIG. 7 shows the control system of the invention applied to an optical amplifier 73. An optical tap 72 is shown on the output of the optical amplifier 73, to enable the optical amplifier control system 5 to be operated in dependence on the output of the optical amplifier. There may be other inputs to the control system (not shown) such as the respective input powers in each band.

The output of the optical amplifier is controlled by controlling the power of a pump laser, using a pump power controller 74. The control system 5 will be arranged to give a maximum output power without any of the powers in each of the respective bands, exceeding their respective thresholds at which unacceptable transmission errors are caused. The control system may also ensure that the power is sufficient that all bands have a signal power exceeding a minimum threshold, at which noise will cause transmission errors. If under some circumstances the minimum threshold is close to or even above the maximum threshold, some transmission errors may be inevitable. In this case the control system can be arranged to minimise the transmission errors, either using a predetermined algorithm, or by actively feeding back a bit error rate as detected at a receiver.

Conceivably, some wavelength bands can be given a higher priority than others, if they are carrying more valuable data, or more sensitive data, or transmission control data. In this case, at some periods, or all the time, control could be carried out on the basis of this subset of one or more higher priority bands, to ensure minimum BER for these bands, even if this is at the expense of degrading the transmission of other bands.

Figure 8:
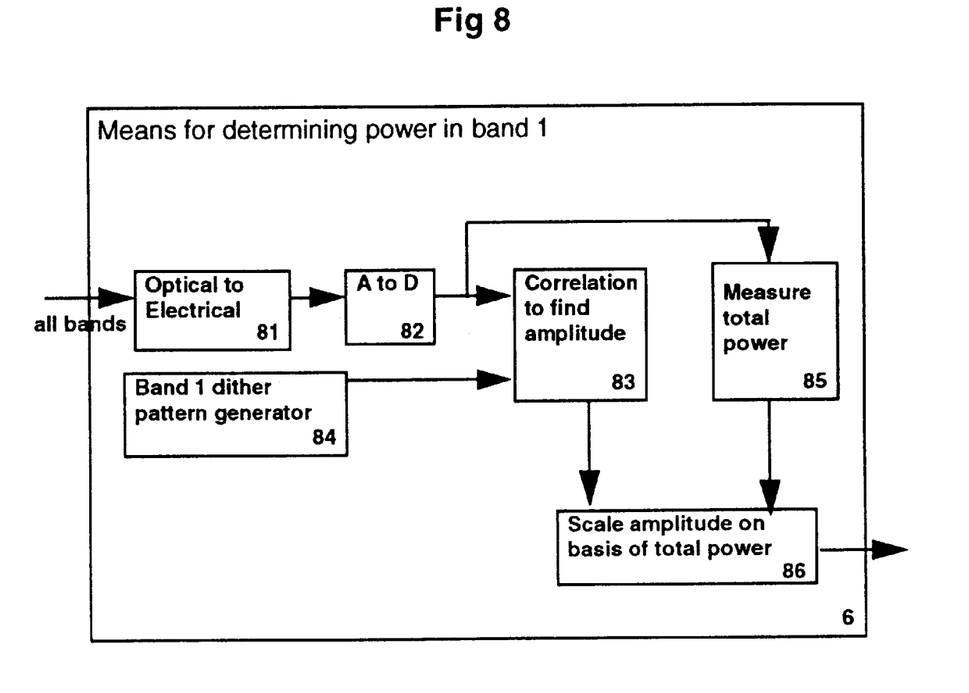
FIG. 8 shows means for determining the power in each band, suitable for use in the control system of FIG. 2.

FIG. 8 shows in schematic form in more detail, an example of a means for determining the power in each band.

FIG. 8 shows an optical to electrical converter 81, and an analogue to digital converter 82 feeding a low frequency portion of all bands to a correlation means 83 and a total power measurement means 85. A dither pattern generator for a particular band (band 1 as illustrated in FIG. 8) is shown in FIG. 8 with reference numeral 84. This pattern generator feeds the correlation means. The strength of correlation indicates an amplitude of the specific dither pattern in band 1. This method relies on different dither patterns being applied to each different band. The different dither patterns should be orthogonal to enable the correlation means to identify the dither uniquely for each band. Means for scaling the detected amplitude 86 are shown in FIG. 8, operating on the basis of the total power measured straight from the output of the A to D converter 82, optionally with a correction factor to compensate for the effects of the optical tap 72, the optical to electrical converter 81, and the analogue to digital converter 82. This technique for determining power in each wavelength band is set out in more detail in U.S. Pat. No. 5,513,029 (Roberts), incorporated herein by reference.

Figure 9:
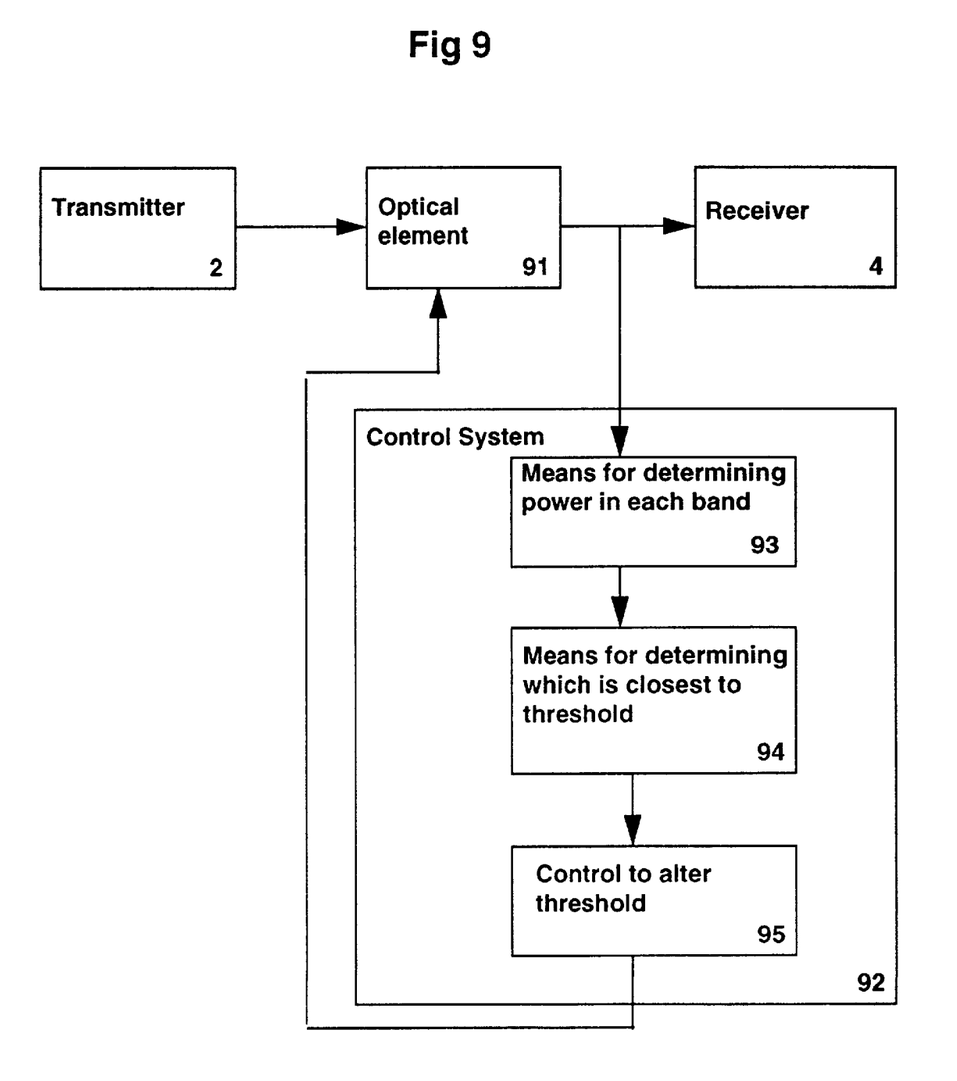
FIG. 9 shows an optical transmission system comprising a control system according to the invention.

FIG. 9 shows a transmission system in which an optical element 91 is provided, controllable by a control system 92. The control system 92 controls a parameter of the optical element which affects an allowable power threshold. The control system comprises means for determining the power in each band, means for determining which band is closest to a power threshold, and control means 95 for altering a parameter of the optical element which affects the threshold. In principle, upper and lower power thresholds for a transmitter or optical amplifier, for example, may be varied by providing external gain somewhere else in the optical path, or attenuation, for example by selective filtering. The number of bands which are multiplexed together can also affect the thresholds, and therefore the optical element of FIG. 9 could be a multiplexing or switching device which can control the number of bands being multiplexed, and alter this by rerouting or retiming some signals as appropriate.

The control system is shown in FIG. 9 as being operable on the basis of the output of the optical element. This is more appropriate if the optical element is an optical amplifier, or if the threshold is the lower power threshold. In other circumstances, it may be more appropriate to feed the control system from elsewhere in the transmission system.

Figure 10:
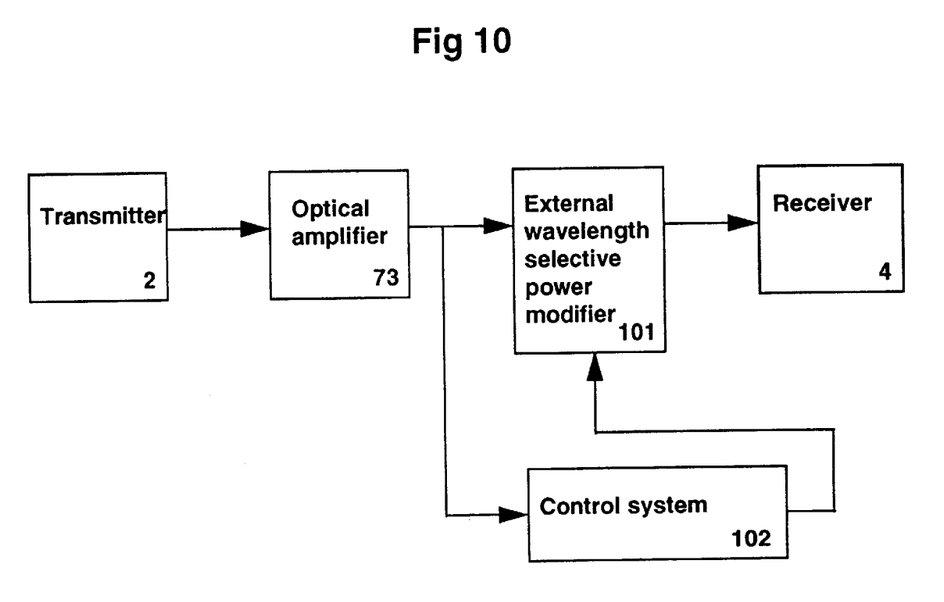
FIG. 10 shows an optical transmission system comprising an external wavelength selective power modifier, and a control system according to the invention.

FIG. 10 shows an example in which the optical element is represented by an external wavelength selective power modifier, such as a filter. The control system 102 for the filter can be implemented in a similar manner to the control systems described above. It is fed by a signal taken upstream of the power modifier, though it could be fed from elsewhere in the optical path, or from a combination of signals before and after the power modifier 101.

In the embodiments shown in FIGS. 9 and 10 there would be some form of control of the output power of the transmitter or optical amplifiers in the optical path. The power control may take the form of the power control described earlier with reference to FIGS. 1 to 8. In particular, an example of a suitable method for the control means 8 of FIG. 2 will now be described. The basic control loop should include the following steps 1. Find the wavelength with the greatest power (using any of the methods described, for example).

2. Calculate the total output power that would be expected to give that wavelength a power equal to the desired peak power setting.

3. Subtract from this the present total output power, to give the power error.

4. Control the total output power setting using a first order digital control loop according to the following equation next power setting=present power setting+K×power error (where K sets the loop gain).

5. Control the amplifier or transmitter to achieve that total output power setting by another first order digital control loop. This second loop should have a time constant at least ten times faster than the time taken to complete all these steps once.

6. Return to step 1.

This method of peak power control eliminates the danger of one of the WDM signals being seriously degraded by non-linearities, as the power level of each signal is controlled to be less than the desired power setting or threshold. The calculation that extrapolates the desired total power level can be a simple scaling of the relative power levels. Alternatively it can include more subtle calculations of the effect of gain tilt resulting from the changed power levels, and consider whether gain tilt would place another signal above the desired peak power setting or upper threshold.

The second loop time constant should be faster than the overall loop to ensure minimal phase shift by the faster loop within the slower loop. Typically the per-band power detection may be carried out every second, depending on how fast the dither correlation can be carried out. The total output power may be measured every millisecond, to enable an adequate and stable response to optical transients.

If a subset of the wavelengths present is examined for greatest power, this could reflect the importance of signals, or the bit rate, and thus susceptibility to non-linearities. If the bit rate is lowered, the upper or lower thresholds may be altered.

Other methods of determining the powers of some or all of the wavelengths present could be used, such as optical filtering, demultiplexing, or optical spectrum analysis. These would involve providing more expensive hardware, but may enable improved accuracy or speed of measurement.

Optical power levels could be measured at a remote location such as the receiver, and data or control commands communicated to the site of the elements to be controlled. This is less desirable if any gain tilt or attenuation between the control site and measurement site would reduce the accuracy of the control. Nevertheless, it might be advantageous to include such tilt or attenuation within the feedback loop particularly for embodiments in which the lower power threshold is measured.

The invention can enable upper or lower margins to be reduced, thus error rates can be reduced, or transmission distances increased, or bit rates increased, or cheaper lower power transmitters employed.

Other variations and embodiments will be apparent to a skilled man within the scope of the claims.

I claim:

1. A control system for an optical element for an optical transmission system, the optical element being for use in an optical path of the transmission system, downstream of a transmitter, the control system comprising:

means for determining transmitted optical signal powers in each of a plurality of different optical wavelength bands;

means for determining which of the powers is greatest; and means for controlling an output power of the element, on the basis of the greatest power.

2. The system of claim 1 the means for determining which is the greatest of the powers comprising means for determining which of the powers is closest to a threshold.

3. The system of claim 2 comprising means for determining the threshold as the maximum power for a given risk of transmission errors.

4. The system of claim 2 comprising means for determining a second threshold as the minimum power for a given risk of transmission errors, and means for determining which of the powers is closest to the second threshold, the means for controlling the output power being further operable on the basis of the power closest to the second threshold.

5. The system of claim 2 wherein the threshold comprises an individual threshold for each band, wherein the means for determining which of the powers is closest to the threshold, is operable to compare each power to its respective individual threshold.

6. The system of claim 1 wherein the greatest power determining means comprises means for estimating a future power for at least one of the bands, wherein the greatest power is determined on the basis of the estimated future power.

7. The system of claim 1 wherein the power determining means comprises:
means for measuring the amplitude of low frequency dither signals in each of the bands of the transmitted optical signal;
means for measuring the total power; and
means for deriving the power in each band from the amplitudes and the total power.

8. The system of claim 1 wherein the power determining means is located remotely from the element.

9. The system of claim 1 wherein the control means is operable to maintain at least the determined power or powers within a desired range.

10. An optical amplifier incorporating the control system of claim 1, wherein the power determining means is operable to determine output powers of the amplifier.

11. A control system for an optical transmission system, the transmission system comprising a transmitter, the control system comprising:
means for determining optical power at a plurality of different optical wavelength bands in the transmission system;
means for determining which of the powers is greatest; and
means for controlling on the basis of the greatest power a parameter of the transmission system downstream of the transmitter, and which affects a power threshold at which transmission errors may be caused.

12. A control system for an optical wavelength division multiplexed transmission system, the transmission system comprising a transmitter, the control system comprising:
means for determining optical powers in a plurality of different optical wavelength bands in the transmission system;
means for selecting a subset of more than one of the determined powers, the selection being made according to which of the wavelength bands are currently more susceptible to errors; and
means responsive to the selected subset of powers to control a parameter of the transmission system downstream of the transmitter, to maintain at least the subset of determined powers within a given range.

13. A method of controlling an optical element, the optical element being for use in an optical path of the transmission system, downstream of a transmitter, the method comprising the steps of:

determining optical powers in each of a plurality of different optical wavelength bands;
determining which of the powers is greatest; and
controlling an output power of the element on the basis of the greatest output power.

14. A method of operating an optical transmission system the transmission system comprising a transmitter, the method comprising the steps of:
determining optical powers in each of a plurality of different optical wavelength bands;
determining which of the powers is greatest; and
controlling on the basis of the greatest power, a parameter of the system downstream of the transmitter, which affects a threshold power at which transmission errors may be caused.

15. A method of controlling an optical element in an optical path of the transmission system, downstream of a transmitter, the method comprising the steps of:
determining optical powers in each of a plurality of different optical wavelength bands;
selecting a subset of more than one of the determined powers, the selection being made according to which of the wavelength bands are currently more susceptible to errors; and
controlling a parameter of the optical element on the basis of the selected subset of powers.

16. A method of operating an optical transmission system comprising an optical amplifier, the method comprising the steps of:
determining optical output powers in each of a plurality of wavelength bands;
selecting a subset of more than one of the determined powers, the selection being made according to which of the wavelength bands are currently more susceptible to errors; and
controlling the total output power of the amplifier on the basis of the subset.

17. A control system for an optical element for an optical transmission system, the optical element being for use in an optical path of the transmission system, downstream of a transmitter, the control system comprising:
circuitry for determining transmitted optical powers in each of a plurality of different optical wavelength bands;
circuitry for determining which of the powers is greatest; and circuitry for controlling an output power of the element, on the basis of the greatest power.

* * * * *